(12) United States Patent
Hill et al.

(10) Patent No.: US 8,500,889 B2
(45) Date of Patent: Aug. 6, 2013

(54) GAS ADSORPTION MATERIAL

(75) Inventors: Matthew Roland Hill, Victoria (AU); Katherine Michelle Nairn, Victoria (AU); Aaron Thornton, New South Wales (AU); Dario Buso, Victoria (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 239 days.

(21) Appl. No.: 13/138,086

(22) PCT Filed: Jan. 5, 2010

(86) PCT No.: PCT/AU2010/000004
§ 371 (c)(1),
(2), (4) Date: Aug. 30, 2011

(87) PCT Pub. No.: WO2010/075610
PCT Pub. Date: Jul. 8, 2010

(65) Prior Publication Data
US 2011/0297558 A1    Dec. 8, 2011

(30) Foreign Application Priority Data
Jan. 5, 2009  (AU) ............................ 2009900030

(51) Int. Cl.
*B01D 53/02* (2006.01)
*B01J 20/02* (2006.01)

(52) U.S. Cl.
USPC .............. 96/153; 206/0.7; 502/401; 502/526; 556/1

(58) Field of Classification Search
USPC .............. 96/108, 153; 206/0.7; 502/400, 502/401, 526; 423/648.1; 429/515; 556/1; 548/101
See application file for complete search history.

(56) References Cited

U.S. PATENT DOCUMENTS

| | | | |
|---|---|---|---|
| 7,652,132 B2* | 1/2010 | Yaghi et al. ................... | 540/145 |
| 8,343,260 B2* | 1/2013 | Omary et al. ................... | 95/116 |
| 8,372,369 B2* | 2/2013 | Yang et al. .................... | 423/335 |
| 2008/0184881 A1 | 8/2008 | Zhou et al. | |
| 2008/0210901 A1* | 9/2008 | Giannantonio et al. ... | 252/181.5 |
| 2009/0155588 A1* | 6/2009 | Hesse et al. ................... | 428/401 |
| 2012/0152845 A1* | 6/2012 | LeVan et al. .................. | 210/660 |

FOREIGN PATENT DOCUMENTS

| EP | 1 627 933 | 3/2007 |
|---|---|---|
| WO | 2007/130405 | 11/2007 |

OTHER PUBLICATIONS

International Search Report for PCT/AU2010/000004, mailed Feb. 12, 2010.
Chae, H.K. et al., "A route to high surface area, porosity and inclusion of large molecules in crystals", Nature, vol. 427, (Feb. 5, 2004), pp. 523-527.

* cited by examiner

*Primary Examiner* — Frank Lawrence, Jr.
(74) *Attorney, Agent, or Firm* — Nixon & Vanderhye

(57) ABSTRACT

A gas adsorption material comprising: a porous metal-organic framework and a plurality of functionalized fullerenes or fullerides provided in the pores of the metal-organic framework. The metal-organic framework includes a plurality of metal clusters, each metal cluster including one or more metal ions, and a plurality of charged multidentate linking ligands connecting adjacent metal clusters.

20 Claims, 7 Drawing Sheets

GAS ADSORPTION MATERIAL

This application is the U.S. national phase of International Application No. PCT/AU2010/000004, filed 5 Jan. 2010, which designated the U.S. and claims priority to AU Application No. 200900030, filed 5 Jan. 2009, the entire contents of each of which are hereby incorporated by reference.

FIELD OF THE INVENTION

The present invention relates to a material for adsorbing gas molecules. The invention particularly relates to a gas adsorption material comprising a metal organic framework infused with functionalised fullerenes or fullerides, which material has principal applications in gas storage and gas separation.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

There is much current interest in the development of materials or systems for adsorbing gas molecules, particularly for the purposes of gas storage or separation.

Hydrogen and methane are seen as the energy carriers of the future. Hydrogen as a combustion fuel is very environmentally friendly, generating only water as a combustion byproduct. Hydrogen is also an important fuel for fuel cells which generate electricity by the electrochemical oxidation of hydrogen. The use of adsorbed natural gas (ANG) which is primarily methane, as a vehicular fuel is seen as an attractive alternative to compressed natural gas (CNG), which requires operating pressures of 340 atm. so that sufficient gas can be stored on-board, thereby demanding complex multi-stage compression equipment.

However, the storage of hydrogen and methane in a safe and practical manner presents a formidable engineering challenge. Their efficient use as fuels in vehicular transportation is limited by the current requirement to store them in large, heavy and dangerous high-pressure or cryogenic tanks. Storage of hydrogen and methane for such applications is complicated by the fact that these gases are flammable and in some situations explosive. Alternative methodology for storage of these gases exists, but each of the current alternatives is undesirable for one or more reasons.

Carbon dioxide capture and storage is another current area of significant interest. Removal of carbon dioxide from the flue exhaust of power plants, currently a major source of anthropogenic carbon dioxide, is commonly accomplished by chilling and pressurizing the exhaust or by passing the fumes through a fluidized bed of aqueous amine solution, both of which are costly and inefficient. Other methods based on chemisorption of carbon dioxide on oxide surfaces or adsorption within porous silicates, carbon, and membranes have been pursued as means for carbon dioxide uptake. However, in order for an effective adsorption medium to have long term viability in carbon dioxide removal it should combine two features: (i) a periodic structure for which carbon dioxide uptake and release is fully reversible, and (ii) a flexibility with which chemical functionalization and molecular level fine-tuning can be achieved for optimized uptake capacities.

Current research into high volume storage of gases such as hydrogen has largely focussed on physisorption or chemisorption based materials. Metal-organic frameworks have shown great promise as materials with high gas adsorption capacity. They possess intrinsically high surface areas and internal volumes—factors useful for gas storage by physisorption at high pressures and/or low temperatures. However, these operating conditions require heavy and potentially expensive system components for implementation within hydrogen or methane powered vehicles. Consequently, materials that operate at near-to-ambient conditions are highly sought after, as the systemic requirement would be drastically reduced. In order to achieve operation under these conditions, the gas adsorption heat must be drastically increased.

Whilst increasing the heat of adsorption for physisorption based materials is crucial to their widespread implementation, chemisorption based materials such as magnesium and lithium metal hydrides have adsorption heats well above 15.1 kJ/mol, calculated as the value required for room temperature hydrogen storage. Consequently these materials require several hundred degrees for operation, a substantial energy cost.

In order for physisorbed methane (ANG) to present a realistic alternative to CNG for powering vehicles, the US Department of Energy has stipulated methane adsorption of 180 v/v at 298 K and 35 atm. as the benchmark for ANG technology, and the optimum adsorption heat has been calculated at 18.8 kJ mol. Most of the effort has been in the development of porous carbons as storage materials, however, even the most sophisticated carbons strain to obtain any significant improvements over the 180 v/v target, largely because of the inherently low adsorption heat of methane within carbons, typically 3-5 kJ/mol.

It would therefore be desirable to provide an alternative gas absorption material.

SUMMARY OF THE INVENTION

The present inventors have discovered that a substantial increase both in the gas adsorption heat and in the volume of gas adsorbed by metal-organic frameworks (MOFs), may be achieved by impregnating the MOFs with functionalized fullerenes or fullerides. Fullerenes are particularly attractive candidates as components of hydrogen storage materials due to their ability to store up to 58 hydrogen atoms internally without destroying the fullerene structure, which equates to an uptake of 7.5 wt. %. In addition, decoration of the external fullerenes surface with certain metals drastically enhances their surface adsorption performance, yielding 8 wt. % hydrogen uptake through Kubas interaction in the case of transition metal decoration, or up to 60 $H_2$ molecules per fullerene in the case of Li decoration. The hydrophobic nature of fullerenes also makes them attractive candidates for methane storage.

According to a first aspect of the present invention, there is provided a gas adsorption material comprising: (i) a porous metal-organic framework including: (a) a plurality of clusters, and (b) a plurality of charged multidentate bridging ligands connecting adjacent clusters; and (ii) a plurality of functionalized fullerenes or fullerides provided in the pores of the metal-organic framework.

The present invention also provides in a second aspect, a gas storage system including: a container having a storage cavity and a gas storage material according to the first aspect of the present invention positioned within and filling at least a portion of the container.

Moreover, the present invention provides a method of manufacturing the gas adsorption material of the invention.

The metal-organic framework of the present invention includes a plurality of functionalized fullerenes or fullerides in the pores of the metal-organic framework. The presence of functionalized fullerenes/fullerides in the pores of the MOF surprisingly enhances the gas adsorption properties of the metal-organic framework, particularly when compared to the gas adsorption properties of an equivalent metal-organic framework alone or a metal-organic framework with a fullerene (not functionalized) provided in the pores. Typically, the functionalized fullerenes or fullerides are decorated with one or more metals selected from magnesium, aluminium, lithium, sodium, potassium, cesium, calcium and transition metals. Preferably, the functionalized fullerenes or fullerides are magnesium, aluminium and/or lithium decorated fullerenes or fullerides, preferably magnesium decorated fullerenes or fullerides.

The functionalised fullerene or fulleride is preferably based on a spherical or ellipsoidal fullerene. More preferably, the fullerene or fulleride is in the range of $C_{20}$ to $C_{84}$.

The functionalised fullerenes or fullerides are preferably functionalised $C_{60}$ molecules, more preferably, Mg-functionalized $C_{60}$ fullerenes or fullerides. More preferably, the functionalized fullerenes or fullerides comprise Mg-functionalised $C_{60}$ fullerenes including from about 1 to 10 Mg atoms, preferably ten Mg atoms. Magnesium has the advantageous properties of being a light metal that is known to perform comparatively well within the field of high temperature chemisorption based hydrogen storage.

As used herein, the term "cluster" means a moiety containing one or more atoms or ions of one or more metals or metalloids. This definition embraces single atoms or ions and groups of atoms or ions that optionally include ligands or covalently bonded groups.

Preferably, each cluster comprises two or more metal or metalloid ions (hereinafter jointly referred to as "metal ions") and each ligand of the plurality of multidentate ligand includes two or more carboxylates.

Typically, the metal ion is selected from the group consisting of Group 1 through 16 metals of the IUPAC Periodic Table of the Elements including actinides, and lanthanides, and combinations thereof. Preferably, the metal ion is selected from the group consisting of $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $B^{3+}$, $B^{5+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof.

Typically, the cluster has formula $M_m X_n$ where M is metal ion, X is selected from the group consisting of Group 14 through Group 17 anion, m is an integer from 1 to 10, and n is a number selected to charge balance the cluster so that the cluster has a predetermined electric charge Preferably X is selected from the group consisting of $O^{2-}$, $N^{3-}$ and $S^{2-}$. Preferably M is selected from the group consisting of $Be^{2+}$, $Ti^{4+}$, $B^{3+}$, $Li^+$, $K^+$, $Na^+$, $Cs^+$, $Mg^{2+}$, $Ca^{2+}$, $Sr^{2+}$, $Ba^{2+}$, $V^{2+}$, $V^{3+}$, $V^{4+}$, $V^{5+}$, $Mn^{2+}$, $Re^{2+}$, $Fe^{2+}$, $Fe^{3+}$, $Ru^{3+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Zn^{2+}$, $Cd^{2+}$, $Hg^{2+}$, $Si^{2+}$, $Ge^{2+}$, $Sn^{2+}$, and $Pb^{2+}$. More preferably M is $Zn^{2+}$ and X is $O^{2-}$.

Typically, the multidentate linking ligand has 6 or more atoms that are incorporated in aromatic rings or non-aromatic rings. Preferably, the multidentate linking ligand has 12 or more atoms that are incorporated in aromatic rings or non-aromatic rings. More preferably, the one or more multidentate linking ligand comprise a ligand selected from the group consisting of ligands having formulae 1 through 27:

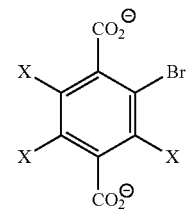

1

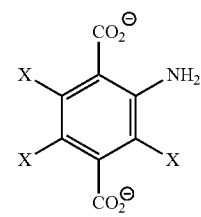

2

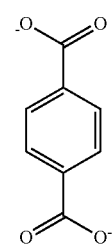

3

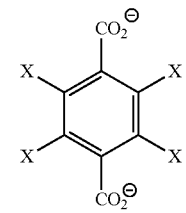

4

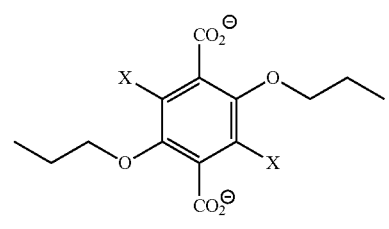

5

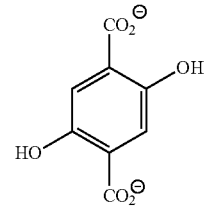

6

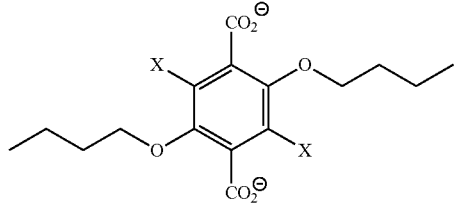

7

8
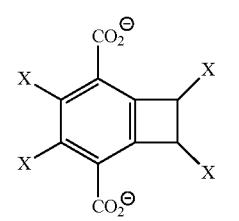
9
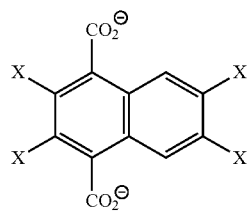
10
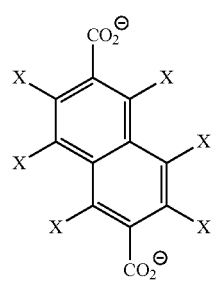
11
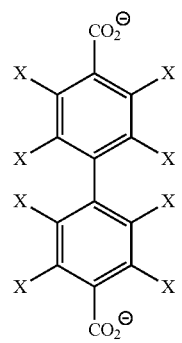
12
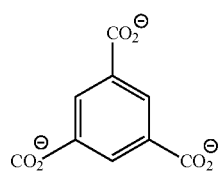
13
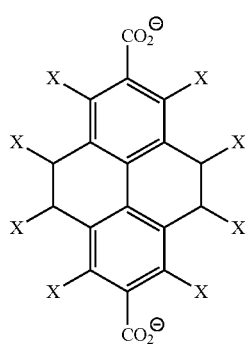
14
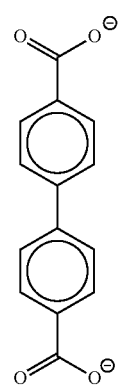
("BPDC")
15
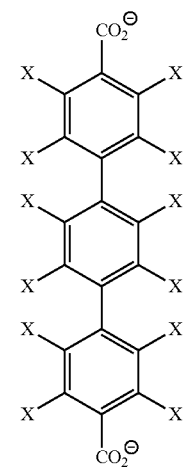
16
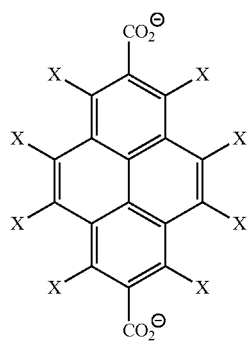

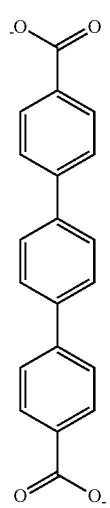
17
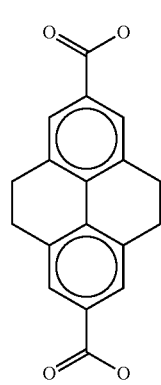
("BTB")
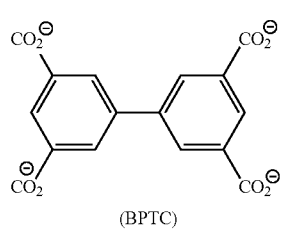
("HPDC")
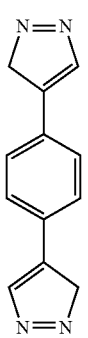
21
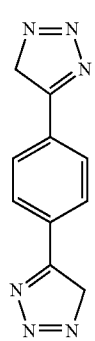
22
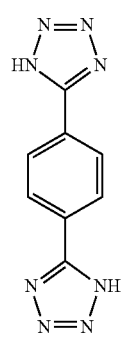
23
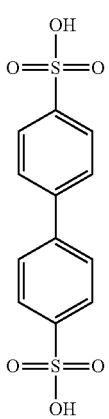
24
18
19
20
(BPTC)

-continued

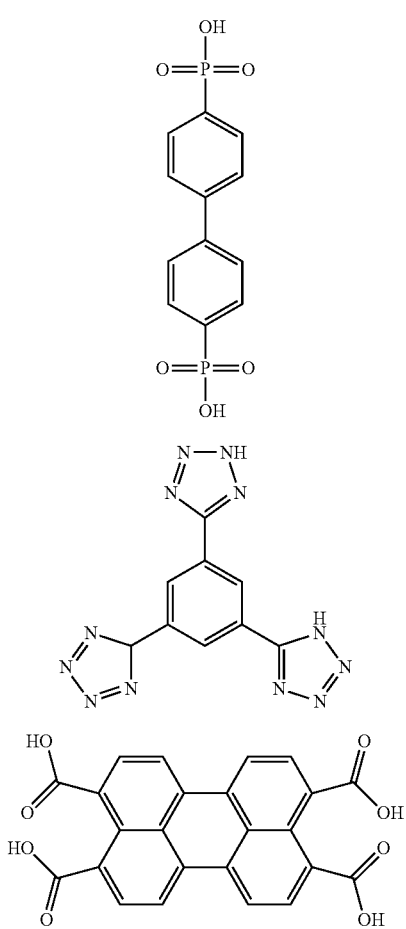

wherein X is hydrogen, —NHR, —N(R)$_2$, halides, C$_{1-10}$ alkyl, C$_{6-18}$ aryl, or C$_{6-18}$ aralkyl, —NH$_2$, alkenyl, alkynyl, —Oalkyl, —NH(aryl), cycloalkyl, cycloalkenyl, cycloalkynyl, —(CO)R, —(SO$_2$)R, —(CO$_2$)R—SH, —S(alkyl), —SO$_3$H, —SO$^{3-}$M$^+$, —COOH, —COO$^-$M$^+$, —PO$_3$H$_2$—, —PO$_3$H$^-$M$^+$, —PO$_3{}^{2-}$M$^{2+}$, or —PO$_3{}^{2-}$M$^{2+}$, —NO$_2$, —CO$_2$H, silyl derivatives; borane derivatives; and ferrocenes and other metallocenes; M is a metal atom, and R is C$_{1-10}$ alkyl.

In one embodiment, the multidentate linking ligand comprises a ligand having formula 3 previously described. In another embodiment, the multidentate linking ligand comprises a ligand having formula 18 ("BTB"). In a further embodiment, the multidentate linking ligand comprises a ligand having formula 14.

The metal-organic framework may be of any known composition. Examples of metal organic frameworks which may be suitable for use in the present invention include those commonly known in the art as MOF-177, MOF-5, IRMOF-1 or IRMOF-8. In a preferred embodiment, the metal-organic framework is MOF-177.

Preferably, the gas comprises a component selected from the group consisting of methane, hydrogen, ammonia, argon, carbon dioxide, carbon monoxide, and combinations thereof. More preferably, the gas is one or more of hydrogen, methane or carbon dioxide.

Typically, the metal-organic framework has pore radii of between 10 and 21 Å, preferably from 13 to 21 Å.

Where the gas adsorbing material is intended for use in adsorbing methane, the pore radii are preferably from 17 to 21 Å. Where the gas adsorbing material is intended for use in adsorbing hydrogen, the pore radii are preferably from 13 to 16 Å.

The gas adsorbing materials of the present invention have a number of applications, including gas storage and release, gas separation and gas cleaning.

In order that the invention can be more readily understood, non-limiting embodiments thereof are now described with reference to the accompanying drawings.

BRIEF DESCRIPTION OF THE DRAWINGS

The invention will now be described in greater detail with reference to embodiments illustrated in the accompanying drawings. In the drawings, the following abbreviations are used.

MOF=metal organic framework;
C$_{60}$@MOF=metal organic framework infused with C$_{60}$; and
Mg—C$_{60}$@MOF=metal organic framework infused with magnesium decorated C$_{60}$.

DETAILED DESCRIPTION OF PREFERRED EMBODIMENTS

Figure 1:
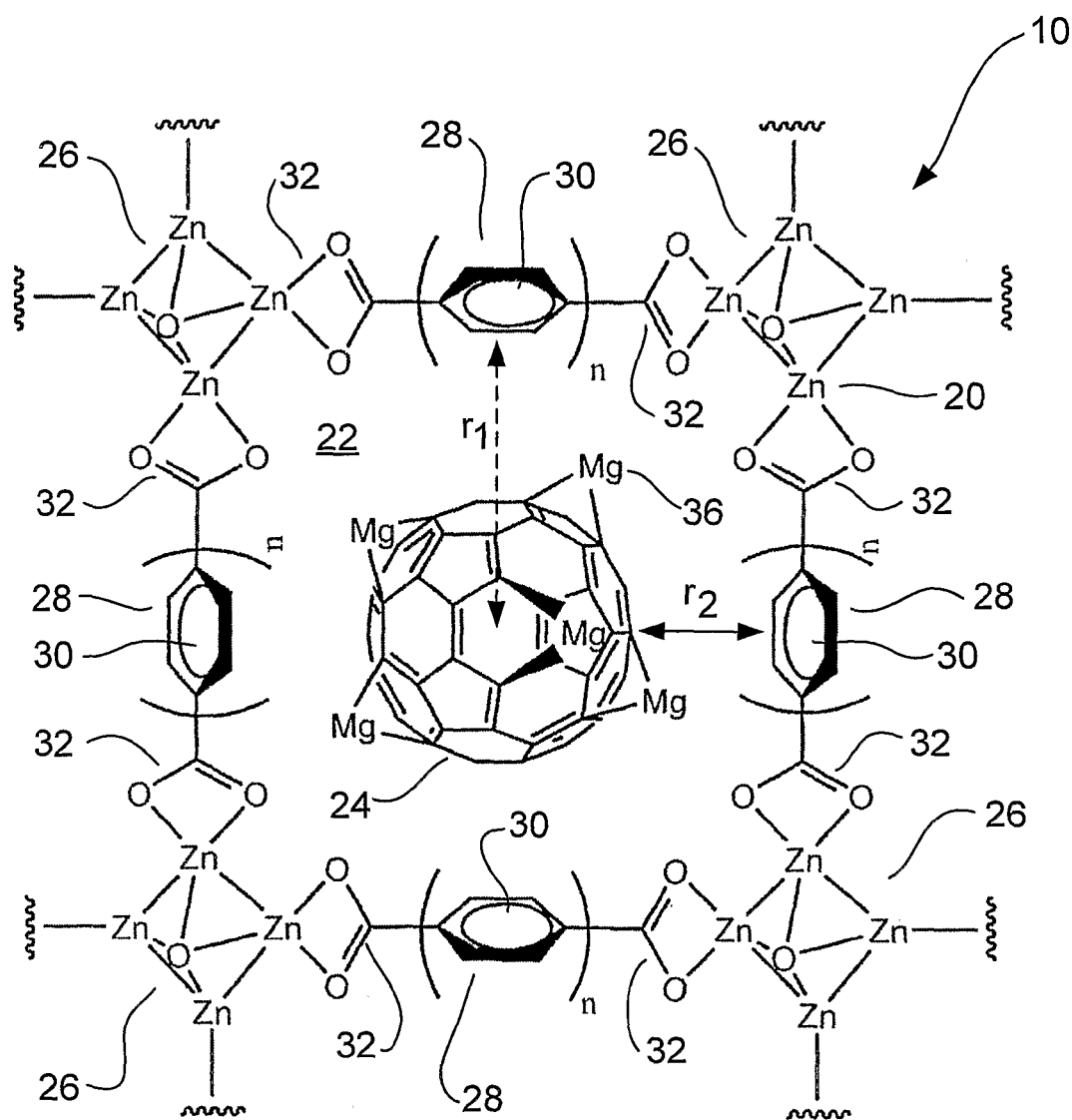
FIG. 1 is a schematic representation of a first embodiment of the gas adsorption material of the invention.

FIG. 1 shows a schematic representation of a first embodiment of the gas adsorption material 10 of the invention.

The gas adsorption material comprises a porous metal-organic framework 20 having pores 22 infiltrated with functionalized fullerenes 24.

The metal-organic framework 20 comprises a plurality of metal clusters 26, and a plurality of multidentate ligands 28 connecting the metal clusters 26. Each metal cluster 26 has the formula Zn$_4$O$^{6+}$.

Each multidentate ligand 28 comprises a plurality of aromatic rings 30 and at least two terminal carboxylate groups 32 for coordinating with respective zinc ions in the metal cluster 26. It is preferred that the multidentate ligand 28 has the formula 18 ("BTB") illustrated previously. While BTB has three terminal carboxylate groups, only two are shown in FIG. 1 for clarity.

A number of pores or cavities 22 are defined within the metal-organic framework.

The geometry of pores 22 can be approximated to a spherical shape having a radius $r_1$. The size of $r_1$ is largely dependent on the size of each ligand 28 and, in particular, the number and configuration of aromatic rings in the ligand 28.

Each pore 22 is infiltrated with a functionalized fullerene molecule 24. The functionalized fullerene 24 comprises a magnesium functionalized $C_{60}$ molecule, which is decorated with ten Mg atoms on its outer surface.

The free volume of the infiltrated pore has a thickness $r_2$.

The inventors conducted modelling studies to predict the adsorption performance of the invented gas adsorption materials, by evaluating the average potential energy for adsorption, volume free for adsorption, heat of adsorption and weight percentage and volumetric hydrogen and methane uptake as a function of pore sizes and fullerene infiltration.

Figure 2:
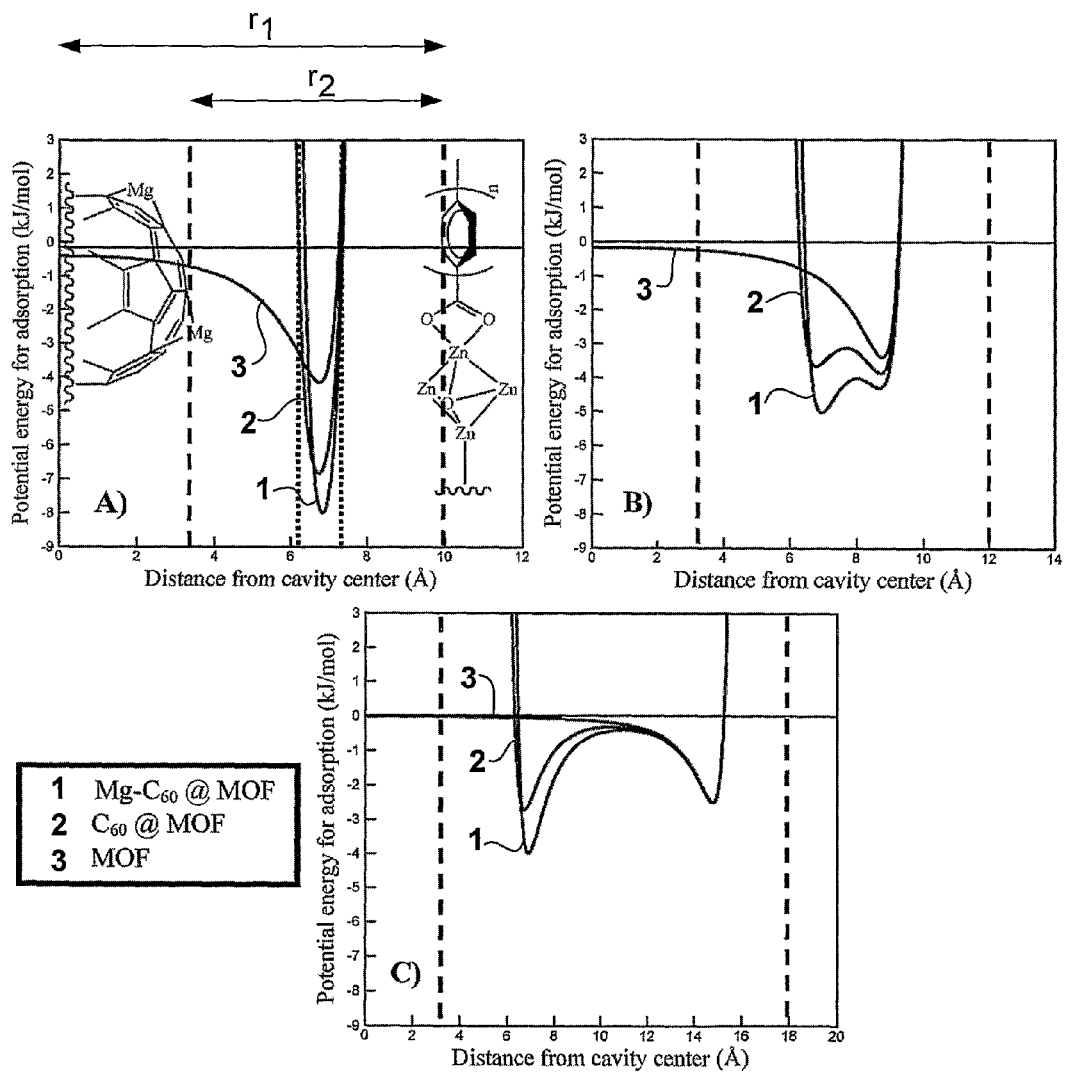
FIGS. 2 (a) to (c) are graphs showing the potential energy for adsorption (kJ/mol) versus distance from cavity centre (Å) for unfilled and filled MOFs having cavity radii of (a) 10 Å, (b) 12 Å and (c) 18 Å.

FIG. 2 shows the potential energy profiles for uninfiltrated MOF (MOF), MOF infiltrated with $C_{60}$ ($C_{60}$@MOF) and MOF infiltrated with Mg decorated $C_{60}$ (Mg—$C_{60}$ @ MOF), for cavity radii of 10, 12 and 18 Å. The vertical dashed lines on FIGS. 2(a), (b) and (c) represent the cavity radius $r_1$ and remaining free volume after infiltration $r_2$ (labelled only on FIG. 2(a)).

Figure 3:
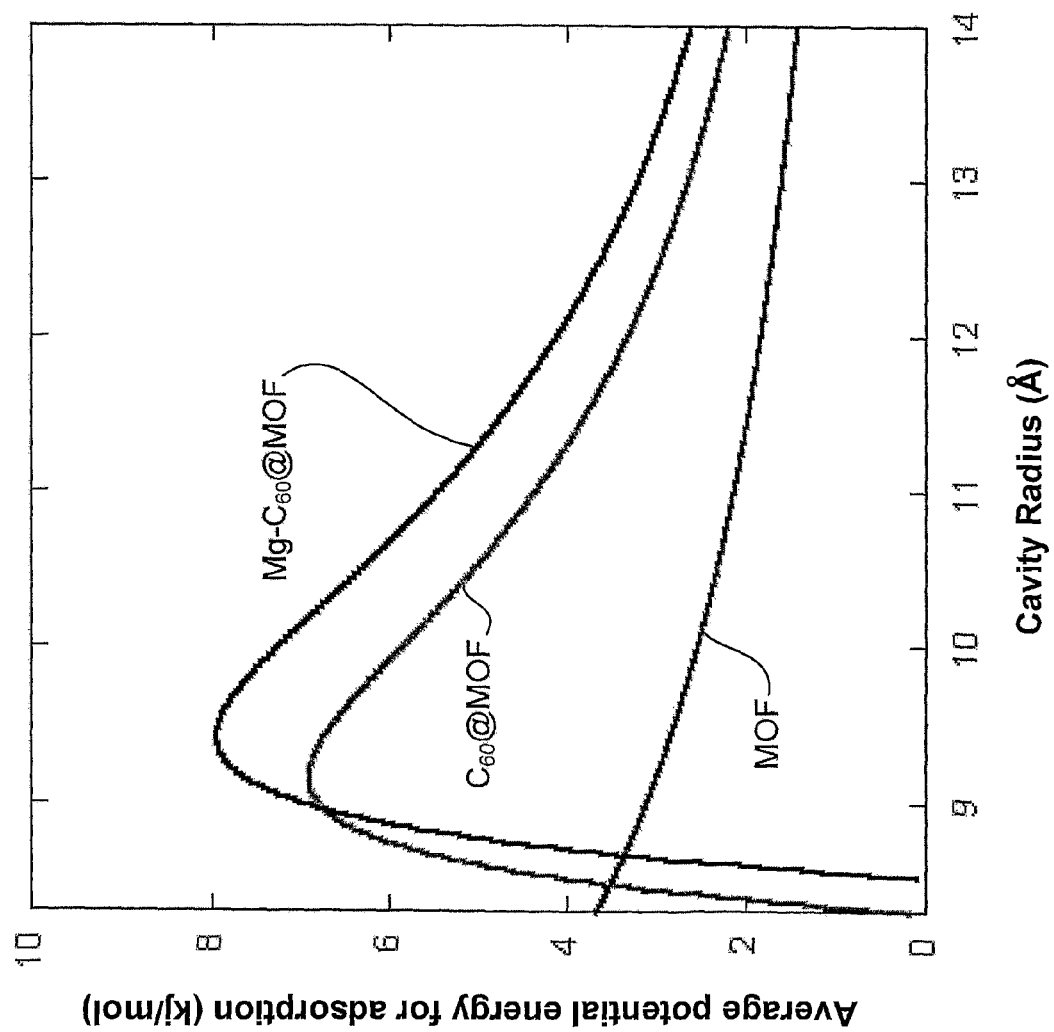
FIG. 3 is a graph showing the average potential energy (kJ/mol) for adsorption versus cavity radius (Å) for MOF, C$_{60}$@MOF and Mg—C$_{60}$@MOF.

Without wishing to be constrained by theory, one of the key benefits from the infiltration of MOF structures is believed to be the surface potential energy overlap from the fullerene 'guest' with that of the MOF 'host' across the remaining free volume. This overlap could both increase adsorption strength, and also the total amount of gas that is adsorbed in a dense fashion, as opposed to simply filling the pores in a low density gaseous form. FIG. 2 demonstrates these effects in three discrete cases, as a function of $r_2$, the distance between MOF and fullerene surfaces, by varying $r_1$, the MOF pore radius. When $r_2$ is particularly short, the overlap of potential energies is particularly strong, and under these conditions would engender gas adsorption at high enthalpies (FIG. 2(a)), but at a cost in the free volume available for adsorption (see discussion of FIG. 4 below). Large $r_2$ distances reduce potential energy overlap (FIG. 2(c)), but at intermediate $r_2$ there exists a region where potential energy enhancement can be achieved whilst maintaining a substantial free volume (FIG. 2(b)). In all cases it is clear that Mg—$C_{60}$ @ MOF has superior performance over $C_{60}$ @ MOF and unfilled MOFs. As shown in FIG. 3, this enhancement is up to 88% for $C_{60}$@ MOF, and extends to 122% for Mg—$C_{60}$ @ MOF.

Figure 4A:
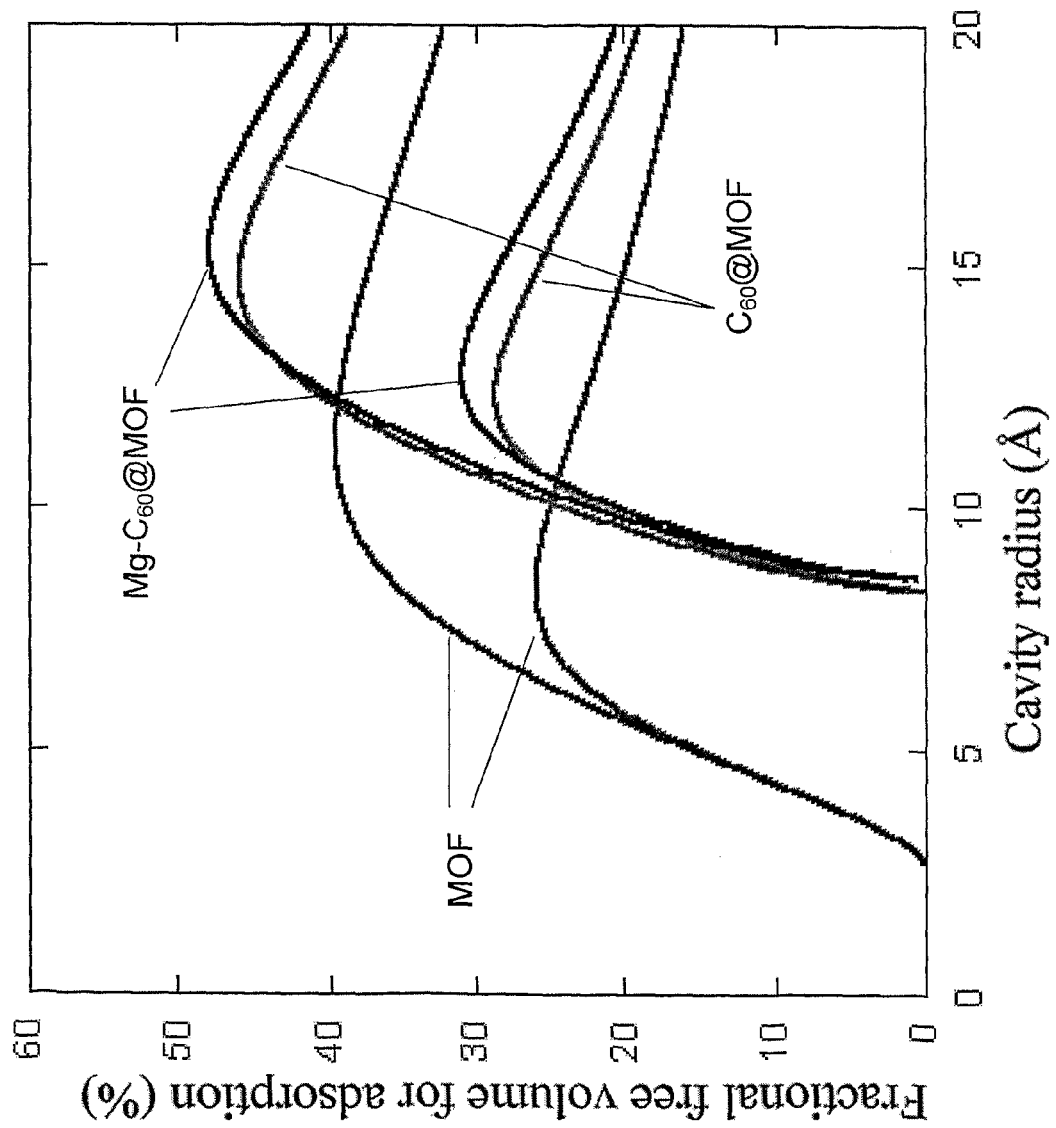
FIGS. 4(a) and (b) are graphs of free volume for adsorption at 298K (lower curves) and 77K (upper curves) for hydrogen (a) and methane (b) adsorption in MOF, C$_{60}$@MOF and Mg—C$_{60}$@MOF.
Figure 4B:
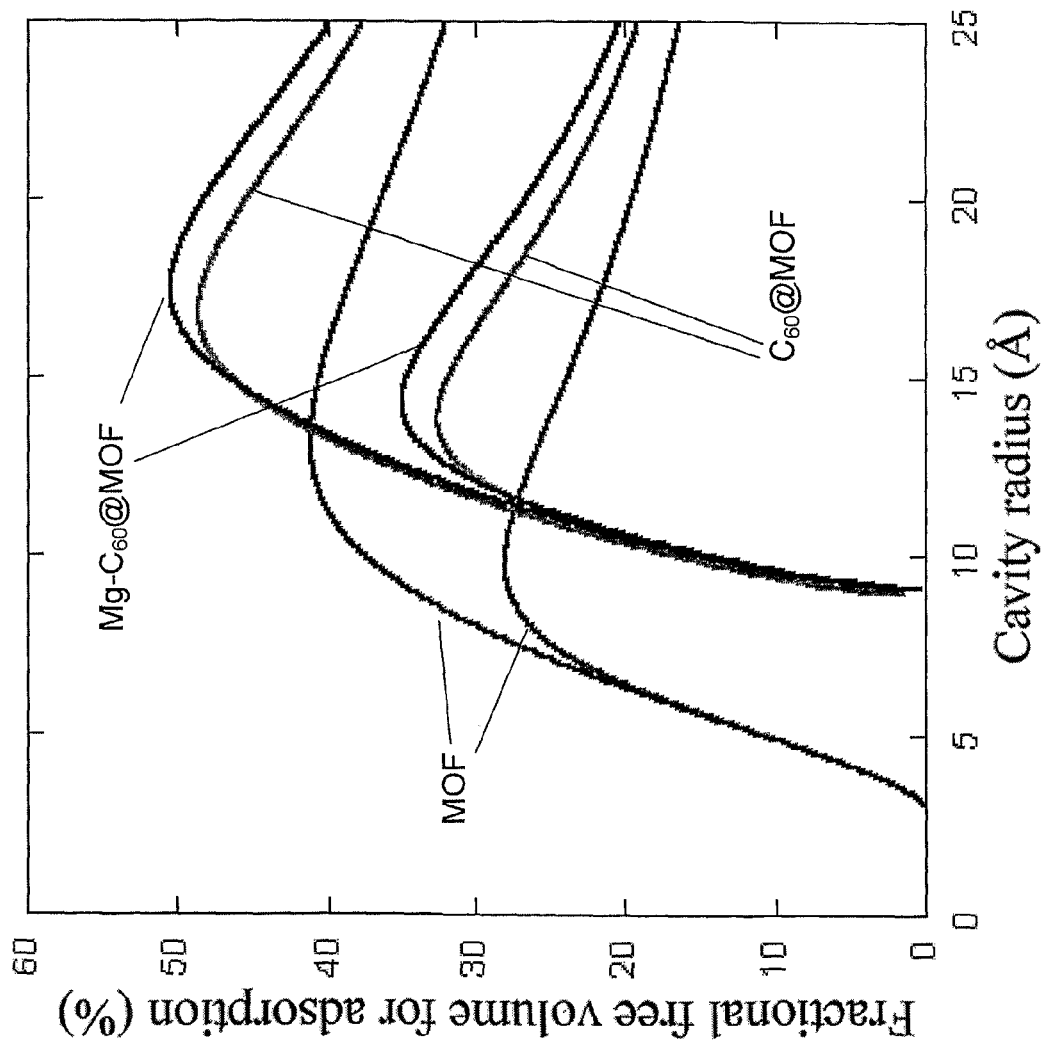

Fractional free volume for adsorption is another key factor governing gas storage within porous materials. It represents the proportion of volume within the MOF cavity where gases will exist in the dense adsorbed state, as opposed to the bulk gaseous state. FIGS. 4A and 4B demonstrate that up to 50% of the free volume within Mg—$C_{60}$ @ MOF is able to house both hydrogen (FIG. 4A) and methane (FIG. 4B) in the densely adsorbed state, almost twice that for empty MOF structures. The optimal cavity radius $r_1$ for both adsorbing gases increases at lower temperatures ($CH_4$ 17.0 Å at 298K, and 21 Å at 77K; $H_2$ 13 Å at 298K and 16 Å at 77K). This is believed to be because at lower temperatures it is possible for gas molecules to be in the adsorbed state at larger distances from the adsorbate's surface creating multiple adsorption layers, and thus larger cavities are required to reach the optimal capacity.

Figure 5B:
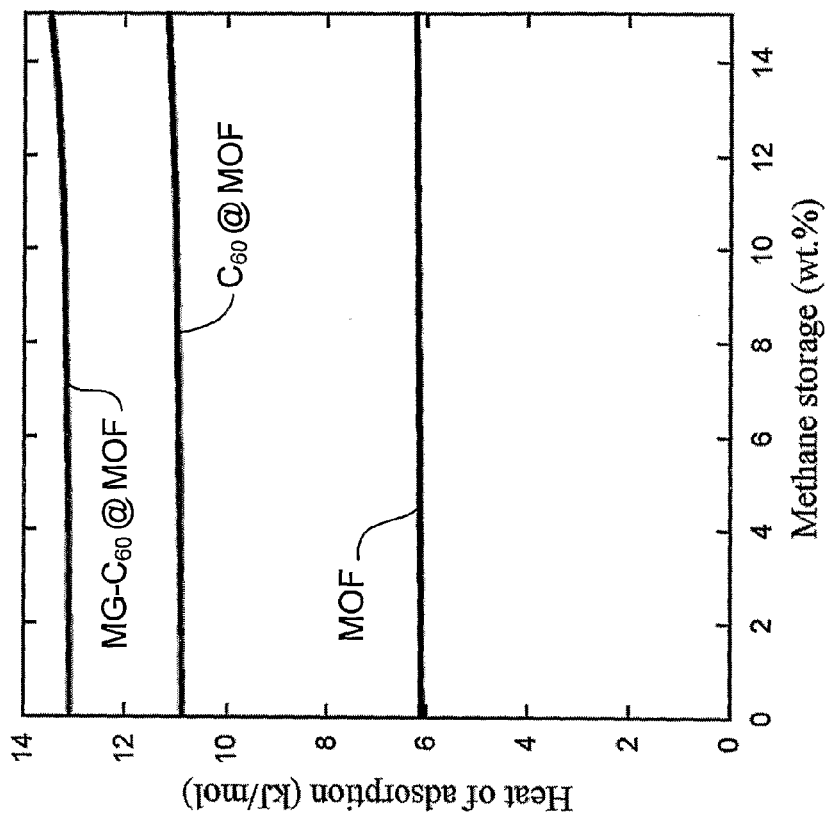
FIGS. 5(a) and (b) are graphs of the heat of adsorption (kJ/mol) within IRMOF-8 (in which the ligand has formula 14) vs wt % storage for hydrogen (a) and methane (b).
Figure 5A:
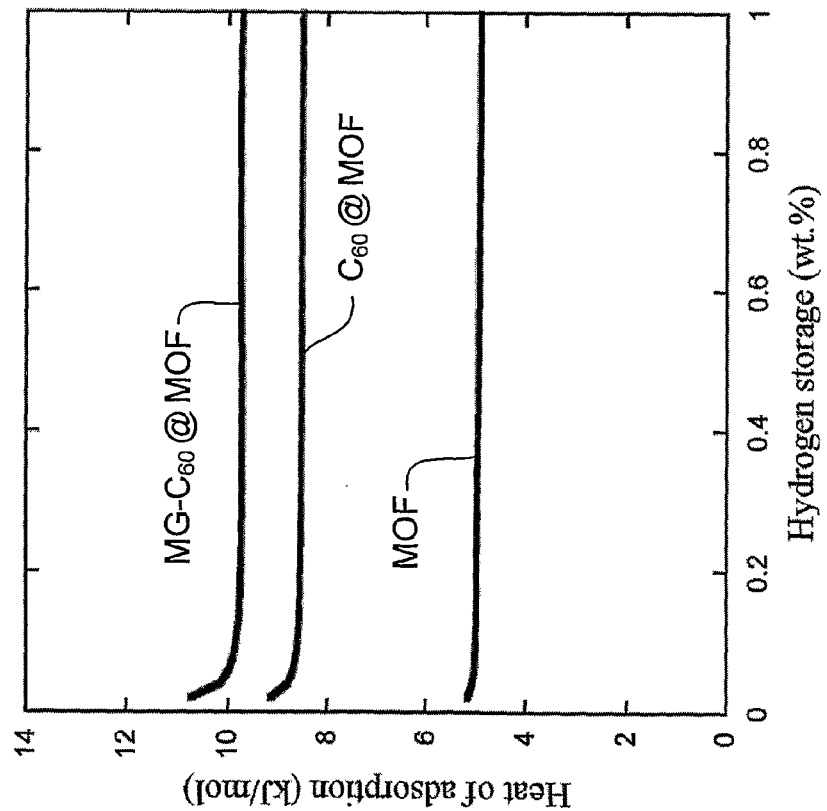

As previously noted, tuning the heat of adsorption within gas storage materials is perhaps the greatest challenge facing those concerned with the viability of hydrogen or methane powered vehicular transport. Most physisorbents operate well below the 15.1 kJ mol-1 considered necessary for room temperature operation. Our modeling of the heats of adsorption of the inventive materials showed that the increase in heat of adsorption observed through fullerene infiltration is stark. FIG. 5 shows the heat of adsorption of hydrogen and methane, respectively, within Mg—$C_{60}$@IRMOF-8. The heat of adsorption for $H_2$ is around 10-11 kJ mol-1 for Mg—$C_{60}$ @ IRMOF-8. To the best of the inventors' knowledge this is the highest value yet reported. The relative increase in adsorption heat for methane uptake is even more marked than for hydrogen, with Mg—$C_{60}$ @ MOF improving adsorption heat by 116%. The measured value, 13.5 kJ mol-1, approaches the ideal operating conditions.

Figure 6B:
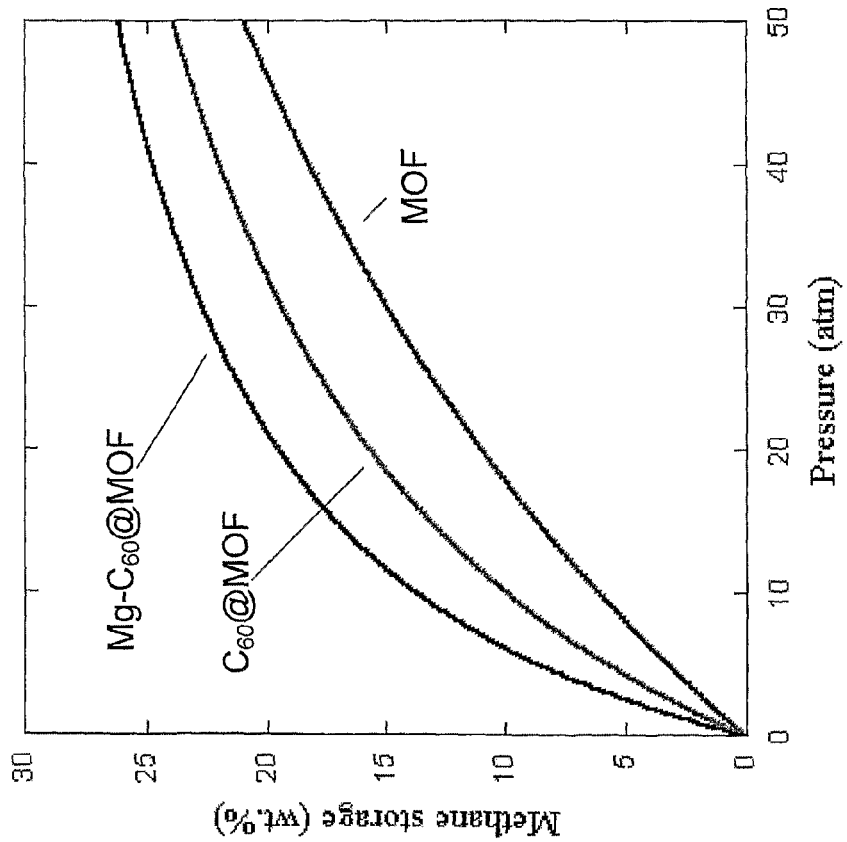
FIGS. 6(a) and (b) are graphs of the wt % gas storage vs pressure (atm) for hydrogen at 77K (a) and methane at 298K (b).
Figure 6A:
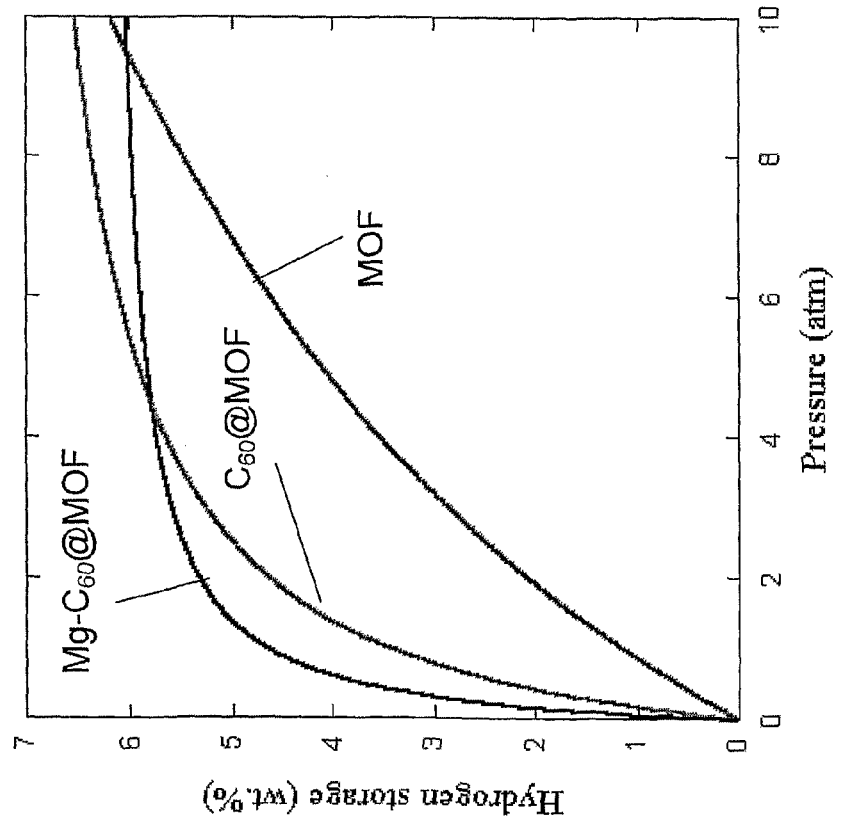

The low pressure gas storage performance of the inventive materials indicate a potential paradigm shift in the future of both hydrogen and methane storage, as shown in FIG. 6. It is shown that at 77 K Mg—$C_{60}$ @ MOF (in this case, IRMOF-8) approaches saturation hydrogen uptake at just 6 atm. By further developing this strategy it is likely that high pressure vessels will not be required to make future hydrogen storage viable.

In the case of methane storage, the observed results exhibit an even greater breakthrough. At 35 atm./298 K, FIG. 6 (b) indicates a 28 wt. % uptake of methane for Mg—$C_{60}$ @ MOF. This equates to 265 v/v, which exceeds the US DoE guidelines of 180 v/v by 47%. Whilst some carbonaceous materials have been reported to show methane uptake as high as 200 v/v under identical conditions, to the best of the inventor's knowledge the highest reported methane storage material is a copper-anthracenate coordination polymer, which exhibits a performance of 230 v/v, 28% higher than the DoE target. This material also has an exceptional adsorption heat of 30 kJ mol-1, which surprisingly exceeds the calculated optimum heat of 18.8 kJ mol-1. In this context the modelled results for Mg—$C_{60}$ @ MOF are remarkable.

Accordingly, the present invention provides a gas adsorption material providing a new concept for hydrogen and methane storage materials. The materials exhibit some exceptional properties, which include methane uptake of 265 v/v, the highest reported value for any material, exceeding the US DoE target by a remarkable 47%, and one of the highest reported physisorption hydrogen adsorption heats of 11 kJ/mol, approaching the calculated optimum value of 15.1 kJ/mol concurrent with saturation hydrogen uptake in large amounts at just 6 atm.

The invention described herein is susceptible to variations, modifications and/or additions other than those specifically described and it is to be understood that the invention includes all such variations, modifications and/or additions which fall within the spirit and scope of the above description.

The inventiion claimed is:

1. A gas adsorption material comprising:
   (i) a porous metal-organic framework including:
      (a) a plurality of metal clusters, each metal cluster including one or more metal ions, and
      (b) a plurality of charged multidentate linking ligands connecting adjacent metal clusters; and
   (ii) a plurality of functionalized fullerenes or fullerides provided in the pores of the metal-organic framework.

2. A gas adsorption material of claim 1, wherein the functionalized fullerenes or fullerides are decorated with one or more metals selected from magnesium, aluminium, lithium, sodium, potassium, cesium, calcium and transition metals.

3. A gas adsorption material of claim 1, wherein the functionalized fullerenes comprise Mg-functionalized $C_{60}$ fullerenes.

4. A gas adsorption material of claim 3, wherein the Mg-functionalised $C_{60}$ fullerenes include from about 1 to 10 Mg atoms, preferably ten Mg atoms.

5. A gas adsorption material of claim 1, wherein each metal cluster comprises two or more metal ions and each ligand of the plurality of multidentate ligand includes two or more carboxylates.

6. A gas adsorption material of claim 1, wherein the metal ion is selected from the group consisting of Group 1 through 16 metals of the IUPAC Periodic Table of the Elements including actinides, and lanthanides, and combinations thereof.

7. A gas adsorption material of claim 1, wherein the metal ion is selected from the group consisting of $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $B^{3+}$, $B^{5+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, and combinations thereof.

8. A gas adsorption material of claim 1, wherein the metal cluster has formula $M_mX_n$ where M is a metal ion, X is selected from the group consisting of Group 14 through Group 17 anions, m is an integer from 1 to 10, and n is a number selected to charge balance the metal cluster so that the metal cluster has a predetermined electric charge.

9. A gas adsorption material of claim 8, wherein X is selected from the group consisting of $O^{2-}$, $N^{3-}$, and $S^{2-}$.

10. A gas adsorption material of claim 8, wherein M is selected from the group consisting of $Be^{2+}$, $Ti^{4+}$, $B^{3+}$, $Mg^{2+}$, $Ca^{2+}$, $Sr^{2+}$, $Ba^{2+}$, $V^{2+}$, $V^{3+}$, $V^{4+}$, $V^{5+}$, $Mn^{2+}$, $Re^{2+}$, $Fe^{2+}$, $Fe^{3+}$, $Ru^{3+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Zn^{2+}$, $Cd^{2+}$, $Hg^{2+}$, $Si^{2+}$, $Ge^{2+}$, $Sn^{2+}$, and $Pb^{2+}$.

11. A gas adsorption material of claim 1, wherein the multidentate linking ligand has 6 or more atoms that are incorporated in aromatic rings or non-aromatic rings.

12. A gas adsorption material of claim 1, wherein the multidentate linking ligands comprise a ligand selected from the group consisting of ligands having formulae 1 through 27:

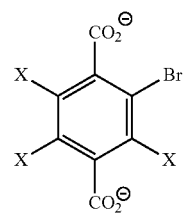

1

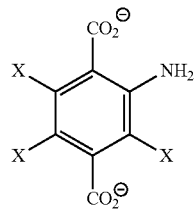

2

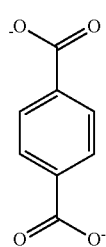

3

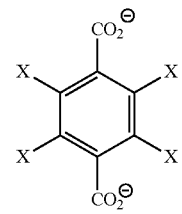

4

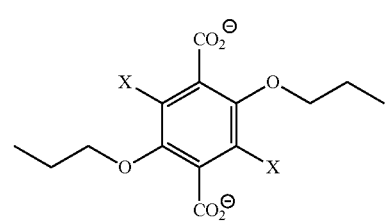

5

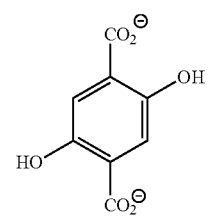

6

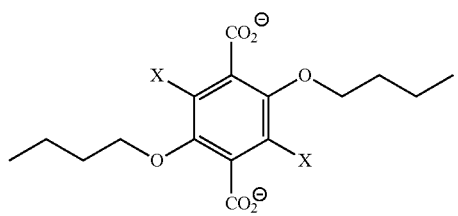

7

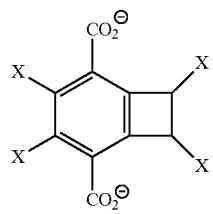

8

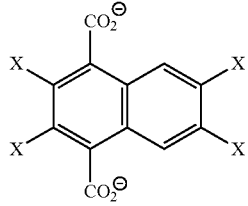

9

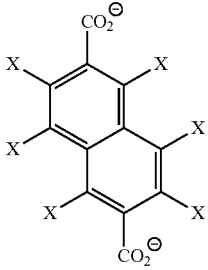

10

-continued
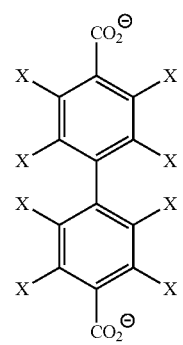
11
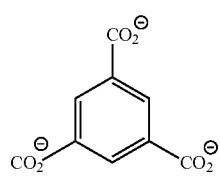
12
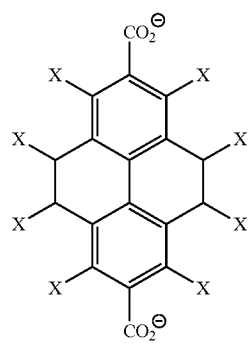
13
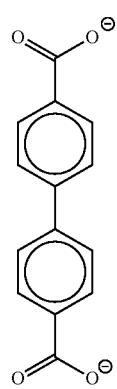
("BPDC")
14
-continued
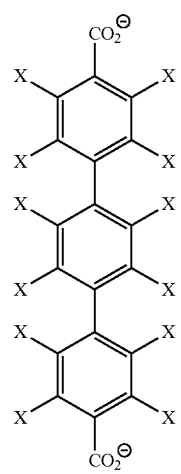
15
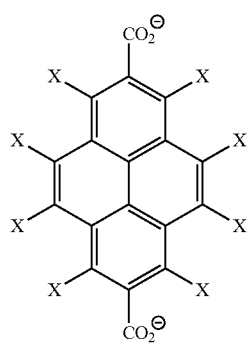
16
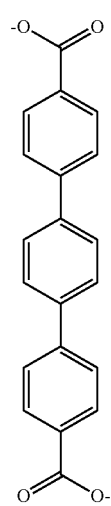
17

18
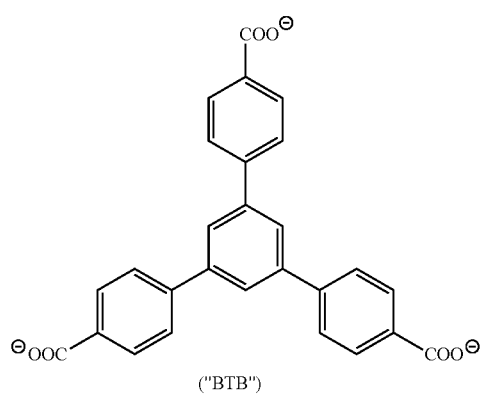
("BTB")
19
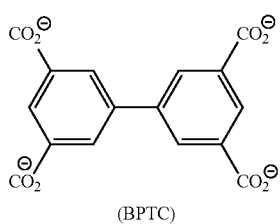
("HPDC")
20
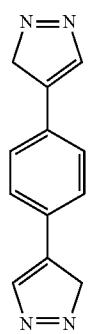
(BPTC)
21
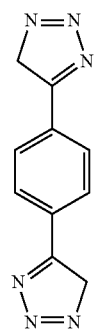
22
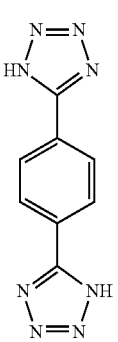
23
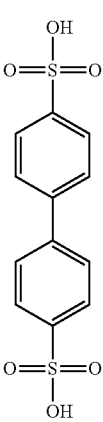
24
25
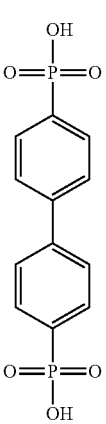

-continued

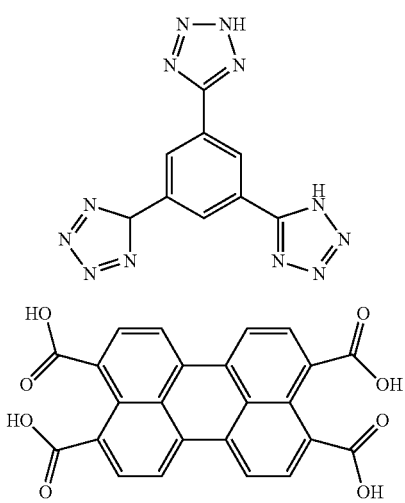

26

27 wherein X is hydrogen, —NHR, —N(R)$_2$, halides, C$_{1-10}$ alkyl, C$_6$- is aryl, or C$_6$-is aralkyl, —NH$_2$, alkenyl, alkynyl, —Oalkyl, —NH(aryl), cycloalkyl, cycloalkenyl, cycloalkynyl, —(CO)R, —(SO$_2$)R, —(CO$_2$)R—SH, —S(alkyl), —SO$_3$H, —SO$_3$"M$^+$, —COOH, —COO"M$^+$, —PO$_3$H$_2$—, —PO$_3$H"M$^+$, —PO$_3$$^{2"}$M$^{2+}$, or —PO$_3$$^{2"}$M$^{2+}$, —NO$_2$, —CO$_2$H, silyl derivatives; borane derivatives; and ferrocenes and other metallocenes; M is a metal atom, and R is C$_{1-10}$ alkyl.

13. A gas adsorption material of claim 12, wherein the multidentate linking ligand comprises a ligand having formula 3, or formula 18.

14. A gas adsorption material of claim 1, wherein the metal-organic framework comprises MOF-177, MOF-5 or IRMOF-8.

15. A gas adsorption material of claim 1, wherein the gas comprises a component selected from the group consisting of methane, hydrogen, ammonia, argon, carbon dioxide, carbon monoxide and combinations thereof.

16. A gas adsorption material of claim 15, wherein the gas is one or more of hydrogen, methane or carbon dioxide.

17. A gas adsorption material of claim 1, wherein the metal-organic framework has pore radii of between 10 and 20 Å, preferably from 13 to 21 Å.

18. A gas adsorption material of claim 15, for adsorbing methane, wherein the metal-organic framework has pore radii from 17-21 Å; or hydrogen, wherein the metal-organic framework has pore radii from 13-16 Å.

19. A gas adsorption material of claim 1, wherein said material is used for at least one of gas storage and/or release, gas separation or gas cleaning.

20. A gas storage system comprising:
a container having a storage cavity;
a gas storage material according to claim 1 positioned within
and filling at least a portion of the container.

* * * * *